US009677311B2

(12) United States Patent
Shaw et al.

(10) Patent No.: US 9,677,311 B2

(45) Date of Patent: Jun. 13, 2017

(54) TAILGATE COUNTERBALANCE WITH DUAL TORQUE RODS

(71) Applicant: VENTRA GROUP, CO., Halifax, Nova Scotia (CA)

(72) Inventors: David W. Shaw, Newmarket (CA); Joaquin Hung, Markham (CA)

(73) Assignee: VENTRA GROUP, CO., Halifax, Nova Scotia (CA)

( * ) Notice: Subject to any disclaimer, the term of this patent is extended or adjusted under 35 U.S.C. 154(b) by 0 days.

(21) Appl. No.: 15/075,482

(22) Filed: Mar. 21, 2016

(65) Prior Publication Data

US 2016/0347379 A1 Dec. 1, 2016

Related U.S. Application Data

(60) Provisional application No. 62/167,112, filed on May 27, 2015.

(51) Int. Cl.
*B62D 33/03* (2006.01)
*E05F 1/12* (2006.01)

(52) U.S. Cl.
CPC ....... *E05F 1/1238* (2013.01); *E05Y 2900/546* (2013.01)

(58) Field of Classification Search
CPC ........ E05Y 2900/516; E05Y 2900/544; B62D 33/0273; E05F 1/1238; F25D 23/028; Y10T 16/5389
USPC ........ 296/57.1, 146.11, 50, 76; 16/308, 298, 16/75; 49/386
See application file for complete search history.

(56) References Cited

U.S. PATENT DOCUMENTS

| | | | | | |
|---|---|---|---|---|---|
| 2,395,456 | A | | 2/1946 | Bunker | |
| 2,733,476 | A | | 2/1956 | Eck | |
| 2,799,891 | A | * | 7/1957 | Ragsdale | E05F 1/1238 16/308 |
| 2,810,153 | A | * | 10/1957 | Semar | E05F 1/1238 16/308 |
| 2,984,517 | A | * | 5/1961 | Farrow | E05F 1/1238 16/308 |
| 3,031,225 | A | | 4/1962 | Saffer et al. | |
| 3,085,286 | A | | 4/1963 | Whitehouse et al. | |
| 3,122,775 | A | | 3/1964 | Pullyblank | |
| 3,146,847 | A | | 9/1964 | Rutman et al. | |
| 3,166,783 | A | | 1/1965 | Mackier et al. | |
| 3,243,175 | A | | 3/1966 | Sherwood | |

(Continued)

*Primary Examiner* — Kiran B Patel

(74) *Attorney, Agent, or Firm* — Pillsbury Winthrop Shaw Pittman, LLP

(57) ABSTRACT

This disclosure relates to a hinge assembly for mounting a closure member or tailgate to a vehicle. It includes a hinge bracket and connector body for connection to one side of the tailgate. The connector body provides a fixed connection to the vehicle and enables the hinge bracket to rotate about a pivot axis, so that the tailgate rotates. Also included are a first torque rod having one end fixed to the connector body and an opposite, free end, and a second torque rod spaced from the first torque rod and pivot axis. The second torque rod has one end fixed to the hinge bracket and an opposite, free end. A connector device anchors the free ends of the torque rods together within the tailgate, so that the rods deflect when the tailgate is pivoted between its opened and closed positions to produce a biasing torque towards an opposite position.

20 Claims, 6 Drawing Sheets

(56) References Cited

U.S. PATENT DOCUMENTS

| | | | | | |
|---|---|---|---|---|---|
| 3,258,289 | A | | 6/1966 | Malinowski | |
| 3,336,070 | A | * | 8/1967 | Jackson | B60J 5/103 16/308 |
| 3,370,317 | A | | 2/1968 | Marchione | |
| 3,402,508 | A | | 9/1968 | Kessler | |
| 3,643,378 | A | | 2/1972 | Velavicius et al. | |
| 3,649,067 | A | | 3/1972 | Louton | |
| 3,695,678 | A | * | 10/1972 | Gergoe | E05F 1/1238 16/308 |
| 3,699,716 | A | | 10/1972 | Wanlass | |
| 3,787,923 | A | | 1/1974 | Peterson | |
| 3,815,685 | A | | 6/1974 | Seifert | |
| 3,955,241 | A | * | 5/1976 | Little | E05F 1/1223 16/298 |
| 4,143,904 | A | | 3/1979 | Cooper et al. | |
| 4,152,011 | A | | 5/1979 | Sano et al. | |
| 4,291,501 | A | | 9/1981 | Steinberg et al. | |
| 4,378,658 | A | | 4/1983 | DeLorean | |
| 4,589,164 | A | | 5/1986 | Leonard | |
| 4,691,956 | A | * | 9/1987 | Hodge | B60P 1/26 292/DIG. 29 |
| 4,701,977 | A | | 10/1987 | Hori et al. | |
| 4,702,511 | A | | 10/1987 | Olins | |
| 4,787,809 | A | | 11/1988 | Zrostlik | |
| 4,845,811 | A | | 7/1989 | Fargnier | |
| 4,905,347 | A | * | 3/1990 | Wroth | E05F 1/123 16/308 |
| 5,039,154 | A | | 8/1991 | Lewis | |
| 5,358,301 | A | * | 10/1994 | Konchan | B62D 33/0273 16/308 |
| D370,453 | S | | 6/1996 | Shortman et al. | |
| 5,606,773 | A | | 3/1997 | Shappell | |
| 5,641,262 | A | | 6/1997 | Dunlop et al. | |
| 5,664,289 | A | * | 9/1997 | Wolda | E05F 1/1238 16/298 |
| 5,787,549 | A | | 8/1998 | Soderlund | |
| 5,944,373 | A | | 8/1999 | Seksaria et al. | |
| 5,988,724 | A | * | 11/1999 | Wolda | B62D 33/0273 16/308 |
| 6,070,929 | A | * | 6/2000 | Barkley | E05F 1/1033 16/75 |
| 6,283,463 | B1 | | 9/2001 | Park | |
| 6,494,280 | B1 | * | 12/2002 | Friend | E05F 1/1033 16/308 |
| 6,637,796 | B1 | | 10/2003 | Westerdale et al. | |
| 6,769,729 | B1 | * | 8/2004 | Bruford | B62D 33/0273 16/308 |
| 6,793,263 | B1 | * | 9/2004 | Bruford | B62D 33/0273 16/308 |
| 6,796,592 | B1 | | 9/2004 | Austin | |
| 6,846,030 | B2 | * | 1/2005 | Koehler | B62D 33/0273 16/308 |
| 6,874,837 | B2 | * | 4/2005 | Bruford | B62D 33/0273 16/308 |
| 6,905,156 | B2 | | 6/2005 | Miller et al. | |
| 7,140,661 | B1 | * | 11/2006 | Schemm | B62D 33/037 267/273 |
| 7,156,441 | B2 | | 1/2007 | Austin | |
| 7,195,300 | B2 | | 3/2007 | Austin | |
| 7,281,746 | B2 | | 10/2007 | Austin | |
| 7,281,747 | B2 | | 10/2007 | Austin | |
| 7,500,706 | B2 | * | 3/2009 | Anderson | E05D 7/1072 296/50 |
| 2003/0189354 | A1 | | 10/2003 | Fabiano | |
| 2004/0178651 | A1 | * | 9/2004 | Austin | B62D 33/0273 296/57.1 |
| 2005/0200150 | A1 | * | 9/2005 | Austin | B62D 33/0273 296/50 |
| 2006/0214454 | A1 | * | 9/2006 | Austin | B62D 33/0273 296/57.1 |
| 2007/0096492 | A1 | * | 5/2007 | Austin | B62D 33/0273 296/50 |
| 2008/0201903 | A1 | * | 8/2008 | Sovis | E05F 1/1215 16/290 |
| 2009/0184533 | A1 | * | 7/2009 | Townson | E05F 1/1292 296/57.1 |
| 2012/0242109 | A1 | * | 9/2012 | Schulte | E05F 1/1238 296/183.1 |
| 2015/0361710 | A1 | * | 12/2015 | Hansen | E05F 15/614 296/51 |

* cited by examiner

TAILGATE COUNTERBALANCE WITH DUAL TORQUE RODS

CROSS REFERENCE TO RELATED APPLICATION

This patent application claims priority to provisional patent application 62/167,112, filed on May 27, 2015, and is incorporated by reference herein in its entirety.

BACKGROUND

Field

This disclosure is generally related to a hinge assembly for a vehicle body closure panel, and, more specifically, to a dual torque rod design for a hinge for use with a vehicle tailgate.

Description of Related Art

One example of a prior art hinge mechanism for vehicle tailgates includes the use of a single torque rod that is provided within and extends the length of the tailgate, connected to hinges on either side. The assembly of the single torque rod through the tailgate generally requires additional time, costs, and operational steps, including installation after the hinges are attached to the tailgate. In some cases, a single torque rod may block access to the bottom edge of the tailgate, e.g., for wiring. Examples are shown in U.S. Pat. Nos. 6,729,729 and 6,796,592.

Some designs have included a bent torque rod in a tailgate. U.S. Pat. No. 5,988,724 provides an example of a single, bent, U-shaped torque rod for use in a tailgate. However, a bent torque rod is a more difficult part to manufacture, due to the very high strength requirements of the torque rod.

SUMMARY

It is an aspect of this disclosure to provide a hinge assembly for mounting a closure member between spaced apart body side panels of a vehicle body for movement about a pivot axis between at least open and closed positions. The hinge assembly includes a hinge bracket and a connector body constructed for connection to one side of the closure member. The connector body also connects to the hinge bracket. The connector body is configured for establishing a fixed connection to the vehicle body and enabling the hinge bracket to rotate about the pivot axis. Also included in the hinge assembly is a first torque rod having one end fixed to the connector body and an opposite, free end, and a second torque rod spaced from the first torque rod and pivot axis. The second torque rod has one end fixed to the hinge bracket and an opposite, free end. A connector device constructed to anchor the opposite, free ends of the first and second torque rods together within the closure member. The torque rods are configured to deflect when the closure member is pivoted between the at least open and closed positions to produce a biasing torque towards an opposite position.

Another aspect provides a vehicle door with a hinge assembly. The hinge assembly includes a hinge bracket and a connector body constructed for connection to one side of the closure member. The connector body also connects to the hinge bracket. The connector body is configured for establishing a fixed connection to the vehicle body and enabling the hinge bracket to rotate about the pivot axis. Also included in the hinge assembly is a first torque rod having one end fixed to the connector body and an opposite, free end, and a second torque rod spaced from the first torque rod and pivot axis. The second torque rod has one end fixed to the hinge bracket and an opposite, free end. A connector device constructed to anchor the opposite, free ends of the first and second torque rods together within the closure member. The torque rods are configured to deflect when the closure member is pivoted between the at least open and closed positions to produce a biasing torque towards an opposite position.

Yet another aspect provides a vehicle that has a body having an opening and a closure member for closing the opening. The closure member is pivotally mounted to the body at the opening for movement about a generally horizontal pivot axis between a raised position and a lowered position. A pair of hinge mechanisms is provided on opposing sides of the closure member. The hinge mechanisms pivotally mount the closure member for the movement about the pivot axis. One of the pair of hinge mechanisms comprises a hinge assembly, and the hinge assembly includes a hinge bracket and a connector body constructed for connection to one side of the closure member. The connector body also connects to the hinge bracket. The connector body is configured for establishing a fixed connection to the vehicle body and enabling the hinge bracket to rotate about the pivot axis. Also included in the hinge assembly is a first torque rod having one end fixed to the connector body and an opposite, free end, and a second torque rod spaced from the first torque rod and pivot axis. The second torque rod has one end fixed to the hinge bracket and an opposite, free end. A connector device constructed to anchor the opposite, free ends of the first and second torque rods together within the closure member. The torque rods are configured to deflect when the closure member is pivoted between the at least open and closed positions to produce a biasing torque towards an opposite position.

Still yet another aspect provides a method for assembling a hinge assembly for mounting a closure member between spaced apart body side panels of a vehicle body for movement about a pivot axis between at least open and closed positions. The method includes connecting a first end of a first torque rod to a connector body constructed for connection at the one side of the closure member and for connecting to a hinge bracket. The connector body is configured for establishing a fixed connection to the vehicle body and enabling the hinge bracket to rotate about the pivot axis. The first torque rod also has an opposite, free end. The method also includes connecting a first end of a second torque rod to the hinge bracket. The hinge bracket is constructed for connection to one side of the closure member, and the second torque rod also has an opposite, free end and is spaced from the first torque rod and the pivot axis. The method further includes anchoring the opposite, free ends of the first torque rod and the second torque rod together via connector device.

Other aspects, features, and advantages of the present disclosure will become apparent from the following detailed description, the accompanying drawings, and the appended claims.

DETAILED DESCRIPTION OF THE PREFERRED EMBODIMENT(S)

The drawings illustrate a hinge assembly device, generally indicated at 10, for a vehicle closure member used on a vehicle body. The closure member is typically associated with an opening, e.g., a pick-up truck bed or a lift gate for an SUV. For example, the device could be used to assist movement of a trunk lid, a hood, or any other closure member. As described herein, the hinge assembly 10 is designed to be installed on a closure member, such as tailgate, for closing the opening on a pick-up truck. In other variations, the hinge assembly 10 could be used in other environments besides a vehicle. However, for understanding the function and construction of the device 10, it is be described in the context of a tailgate hinge mechanism used in the tailgate of a pick-up truck. The tailgate hinge mechanism mounts the tailgate for pivotal or swinging movement between at least a first (e.g., closed) and a second (e.g., open) positions. As will be further presented, the herein disclosed design allows for the torque rods to assist in at least opening and/or closing the tailgate. It also allows for quick and easy installation into the closure member/tailgate during assembly, as well as a reduction in weight of the tailgate while still supporting it.

The closure member or tailgate is pivotally mounted to the body at the pick-up truck bed opening for movement about a generally horizontal pivot axis A. The tailgate extends generally horizontally along the pick-up truck bed opening. The tailgate may be moved between a raised, closed position extending generally vertically and a lowered, open position extending generally horizontally using a pair of hinge mechanisms, for example. Generally, the hinge mechanisms are provided on opposing sides of the tailgate, and are used to pivotally mount the tailgate for movement about the pivot axis A with respect to the pick-up truck bed. Tailgates and hinges for mounting them are well-known, and shown in the prior art cited above (the '729, '592, and '724 references), each of which is hereby incorporated by reference in its entirety.

As described in detail below, one of the hinge mechanisms of the vehicle includes the herein disclosed hinge assembly 10. That is, the hinge assembly 10 is attached to one side of the tailgate, i.e., on the left side or on the right side, but not both. This is so that the attached side acts as a driving or controlling side, while the opposite side follows the movement of the driving side. The opposite side of the tailgate will include its own hinge mechanism that may include a connector body that connects to that second/opposite side of the tailgate and to a second of the side panels of the vehicle body so that it rotates about the pivot axis A when the tailgate is moved via the hinge assembly 10. The connector body is generally aligned on and configured to rotate about the pivot axis A as well, so that the tailgate is moved between at least its first and second positions.

Figure 1:
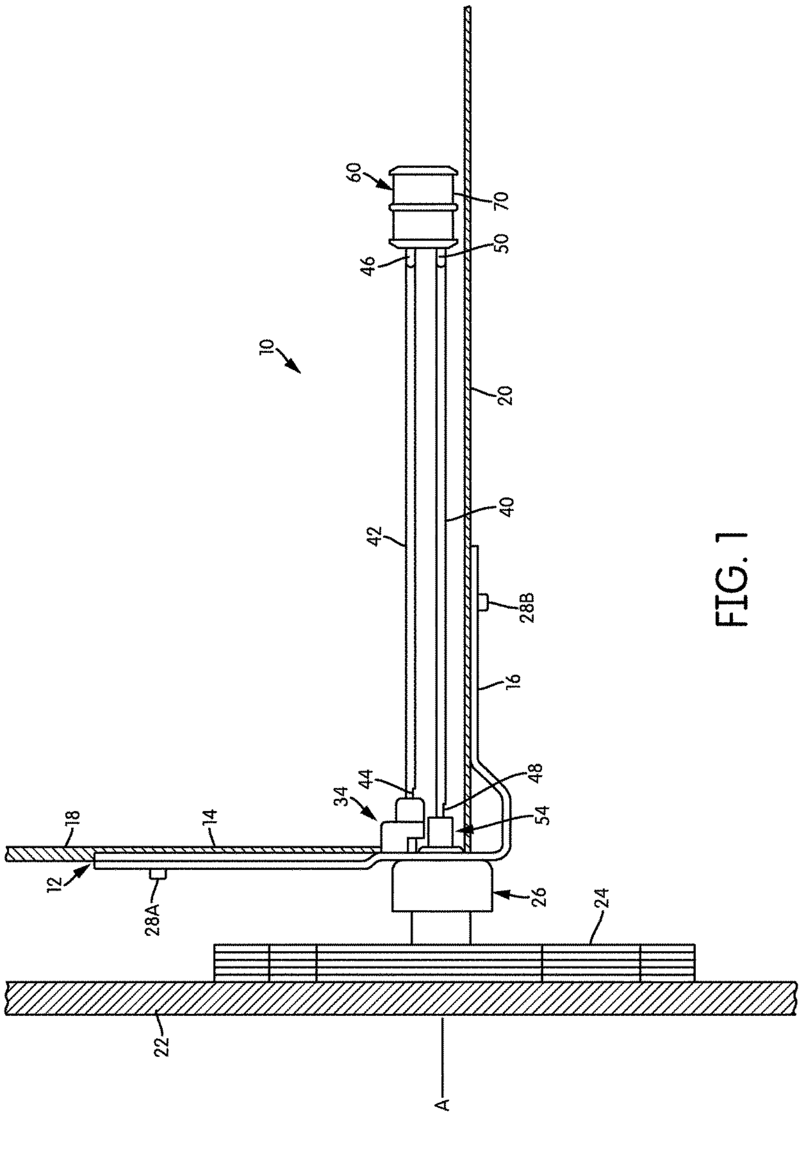
FIG. 1 is a front view of a hinge assembly in accordance with an embodiment of the present disclosure.
Figure 2:
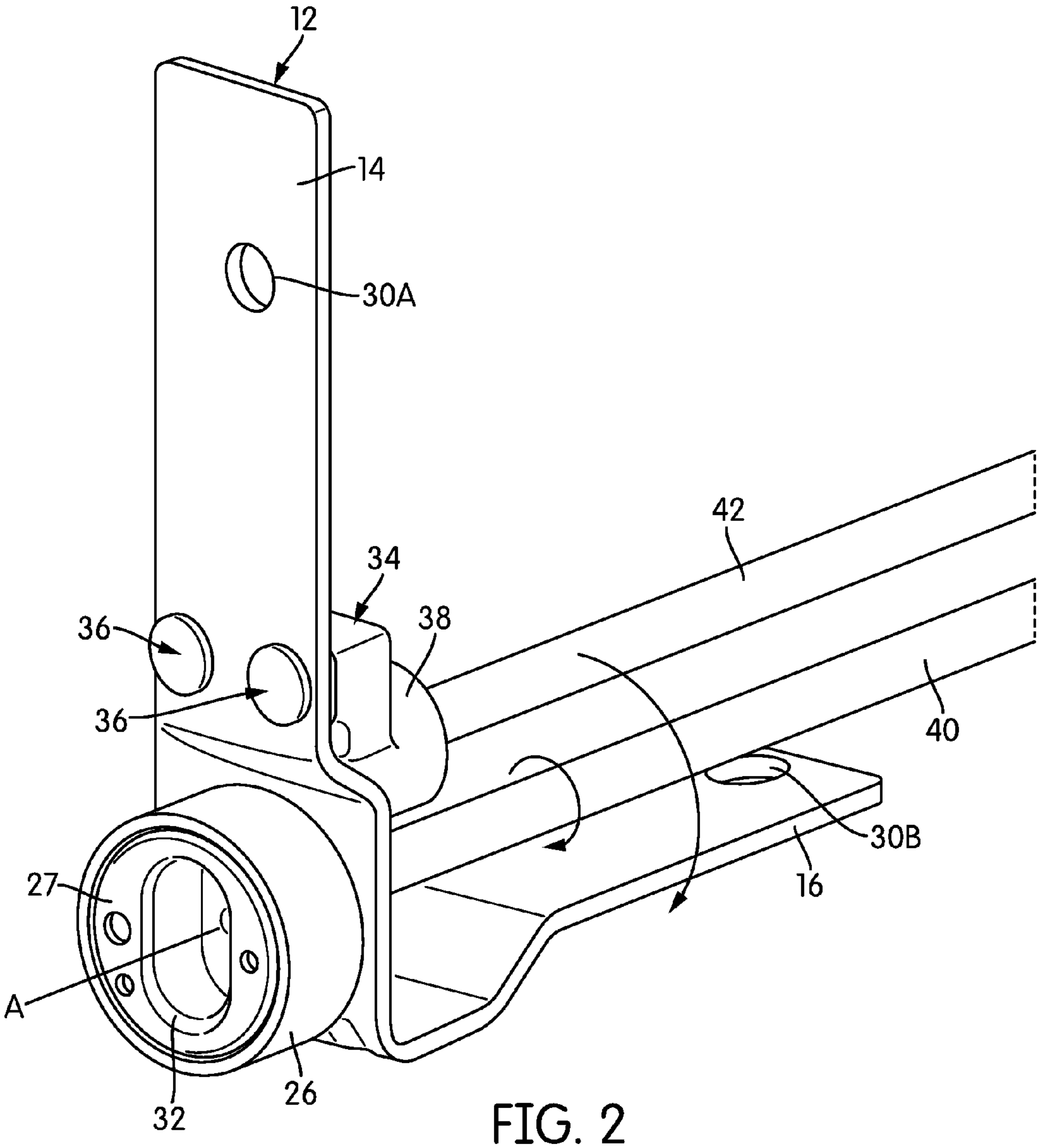
FIG. 2 is a front perspective view of an end of the hinge assembly of FIG. 1.

Referring now back to FIG. 1, the hinge assembly 10 as shown is designed for mounting on a left side of the tailgate. The illustrated hinge assembly 10 includes a generally L-shaped mounting or hinge bracket 12 which is designed for connection to one side of the tailgate; specifically, to vertical end wall panel 18 and bottom wall panel 20 of the tailgate. As shown in FIG. 2, for example, the hinge bracket 12 may include a vertical portion 14 and a horizontal portion 16. Both the vertical portion 14 and horizontal portion 16 of the bracket 12 have at least one opening 30A, 30B (respectively) formed therethrough. The openings 30A, 30B may be used to mount the bracket 12 to the tailgate in a conventional manner, such as by securing devices or fasteners 28A and 28B. The respective holes 30A and 30B provided in the vertical and horizontal portions 14 and 16 may align with holes or openings on the tailgate, and the fasteners 28A and 28B may be received through the holes 30A and 30B (respectively) and fastened, so that the hinge bracket 12 is secured to the tailgate and at least one of the torque rods of the disclosed design is aligned on the pivot axis A. In another embodiment, bracket 12 may also be attached through welding. Specifically, the bottom portion 16 may be affixed to the bottom wall panel 20 of the tailgate, and the vertical portion 14 may be affixed to the vertical end wall panel 18 of the tailgate.

Although the hinge bracket 12 is shown as a single or unitary element, in one embodiment, bracket 12 may also be formed from plurality of combination of elements that are attached together. For example, the bracket 12 may comprise a vertical piece and a horizontal piece (much like vertical portion 14 and horizontal portion 16) that are attached to each other using known attachment methods such as welding, fasteners devices, etc. Also, the bracket 12 may be formed of any appropriate material, such as metal.

The parts used for attachment of the hinge bracket 12 to the vehicle body are generally known in the art. For example, a bushing 26 may be constructed for fixed connection to the hinge bracket 12 at the one (left) side of the tailgate. The bushing 26 is cup-shaped and configured for alignment on and rotation about the pivot axis A when the hinge assembly 10 is attached. The bushing 26 has a cylindrical interior that receives a cylindrical connector body 27, shown in FIG. 2, and can rotate about the connector body 27. The connector body fixedly connects to one of the side panels of the vehicle body, e.g., panel 22, to pivotally secure the tailgate relative to the vehicle body 22 (see FIG. 1). That is, the connector body 27 establishes a fixed connection to the vehicle body 22 and enables the hinge bracket 12 to rotate about the pivot axis A. For example, the connector body 27 may be provided with a non-circular bore 32 (see FIG. 2) that fixedly cooperates with a non-circular hinge pin extending from bracket 24 (e.g., receives an extension portion of the hinge pin 24 therein) that is mounted on the vehicle side panel 22. Since such a connection is generally known in the art incorporated herein, further details are not provided herein.

The hinge assembly 10 further includes a first torque rod 40 and a second torque rod 42 that are constructed for parallel arrangement relative to each other and to the pivot axis A. In accordance with an embodiment, when assembled in the tailgate, the first torque rod 40 is aligned on the pivot axis A, and configured for torsional deflection about the axis A. Each of the first and second torque rods 40 and 42 have a first end that is constructed for securement to the one side of the tailgate, and an opposite, second or free end. As shown in FIG. 1, the first torque rod 40 has its first end 48 fixedly connected to the connector body 27, and its second end 50 is its free end. The first torque rod 48 may be positioned on pivot axis A.

The second torque rod 42 is spaced from the first torque rod 48, and preferably parallel to, axis A, and has its first end 44 connected to the hinge bracket 12, and its second end 46 is its free end. For purposes of this disclosure, a "free" end of the disclosed torque rods is an end of the rod that is not connected to a hinge assembly of the tailgate (disconnected from part of the vehicle). Rather, the free end of each rod in this disclosure is provided within a body of the tailgate and disconnected from any other mechanism. As disclosed herein, the free ends of the rods 40 and 42 are configured for insertion into an opening at one (left) side of the tailgate that the hinge bracket 12 is secured to, and when assembled, the free ends are contained within the body (e.g., between walls) of the tailgate.

In an embodiment, a connector device 60 is provided. The connector device 60 is constructed to anchor the opposite, free ends 50 and 46 of the first and second torque rods 40 and 42 relatively together within the tailgate. That is, it secures the ends 50, 46 of the rods 40, 42 in place such that when the tailgate is opened, a torsional force is applied to at least one of the rods 40 or 42.

Figure 6:
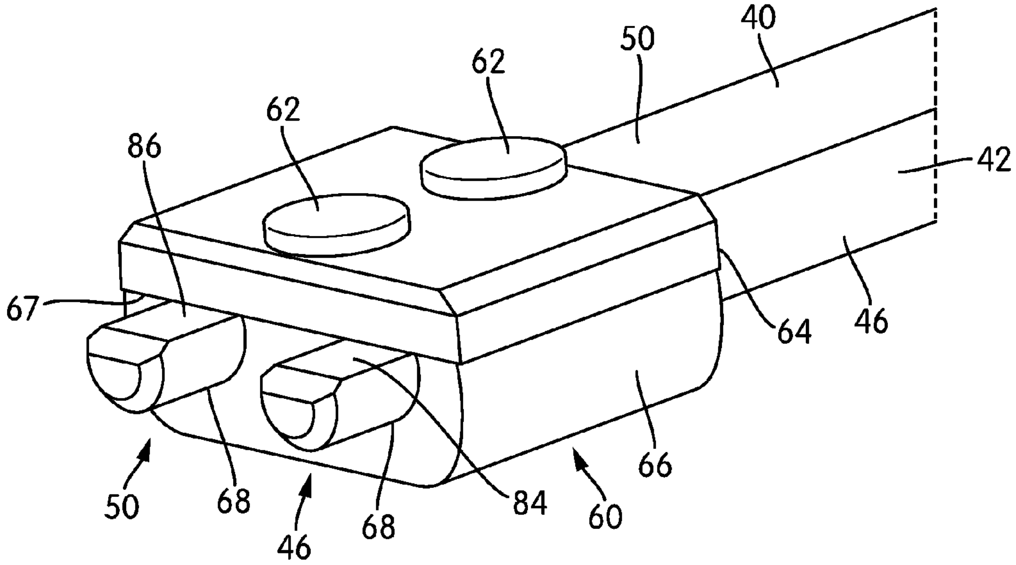
FIG. 6 is a perspective view of a connector device for use with the hinge assembly of FIG. 1 in accordance with yet another embodiment.

In accordance with an embodiment, the connector device 60 includes a first part 64 and a second part 66 for clamping the torque rods 40, 42 therebetween (see FIG. 6). The connector device 60 may include complimentary slots for receiving the first and second torque rods 40, 42 therein. FIG. 6 shows an example of the parts 64, 66 clamping the free ends 50, 46 of the rods (other optional features that are illustrated here are described later). The first and second parts 64, 66 may be secured together in any number of ways, including via one or more fasteners 62, which may or may not be adjustable (e.g., rivets or bolts). By clamping or pinching the torque rods 40, 42 in such a manner, between the parts of the connector device 60, when the tailgate is moved with end 48 of the first torque rod 40 remaining fixed to the non-rotating connector body 27 and end 44 traveling in a circumferential path about axis A, the first torque rod 40 will be subjected to torsion produces the desired torque assist for opening or closing the tailgate. Also, because the connector device 60 may be free within the tailgate interior, the second torque rod 42 may be subject to torsional deflection as well, which also contributes to the torque assist. Similarly, some amount of bending deflection may occur in both rods 40, 42 due to the spaced relation of the torque rods 40, 42, which likewise contributes to the torque assist.

In the illustrated embodiment, at least one of the torque rods, and predominantly first torque rod 40, are configured for twisting or deflection when the tailgate is pivoted between the at least open and closed positions to produce a biasing torque towards an opposite position. That is, first torque rod 40 is twisted in torsion from an untwisted position as the tailgate is pivoted. The biasing of the torque, once the rod 40 is twisted, is translated into a torsion force that is applied to the tailgate to assist in opening and closing towards those positions. More specifically, when the tailgate is in the lowered, open position, a force applied (e.g., by a user) in the raised or closing direction utilizes the biasing force of the first torque rod 40 to translate the torsion force into an assisting force or torque that is applied to the tailgate towards the raised or closed position. Generally, in operation, once twisted, or torqued, the first torque rod 40 applies a continuous force to untwist back to the untwisted position. For example, when the tailgate is in the closed position, the torque rod 40 may apply a torque force to open the tailgate (when unlocked). Similarly, when in the opened position, the torque rod 40 may apply a torque or closing force to move the tailgate and assist movement towards the closed position of the tailgate. In operation, the first torque rod 40 twists in torsion from an untwisted position as the tailgate is pivoted about pivot axis A.

In accordance with an embodiment and mentioned above, the second torque rod 42 is also deflected when the tailgate is moved from the closed position to the open position. That is, when the hinge assembly 10 is rotated about pivot axis A, the first torque rod 40 is torsionally deflected about the pivot axis A, and the second torque rod 42 is deflected due to the fixed securement of the first end 44 of the second torque rod 42 to the bracket 12 as well as the connector device 60 provided on the open ends of the rods. Accordingly, when the tailgate is moved from the open position to the closed position, the deflection of the second torque rod 42 will assist in moving the tailgate towards the closed position.

The deflection of the second torque rod 42 may include a bending component. Specifically, as the second torque rod 42 travels circumferentially about axis A, that causes the connector device 60 to torsionally deflect the first torque rod 40. The reaction force in first torque rod 40 will correspondingly create a moment arm via the connector device 60 that may cause bending of the second torque rod 42, which in the same manner may cause bending of the first torque rod 40 as well. This may likewise cause torsional deflection of rod 42 as well, although the predominant amount of torsional deflection will be on first torque rod 40 along axis A. The overall net forces generated collectively contribute to the torque assist applied to the tailgate.

Figure 3:
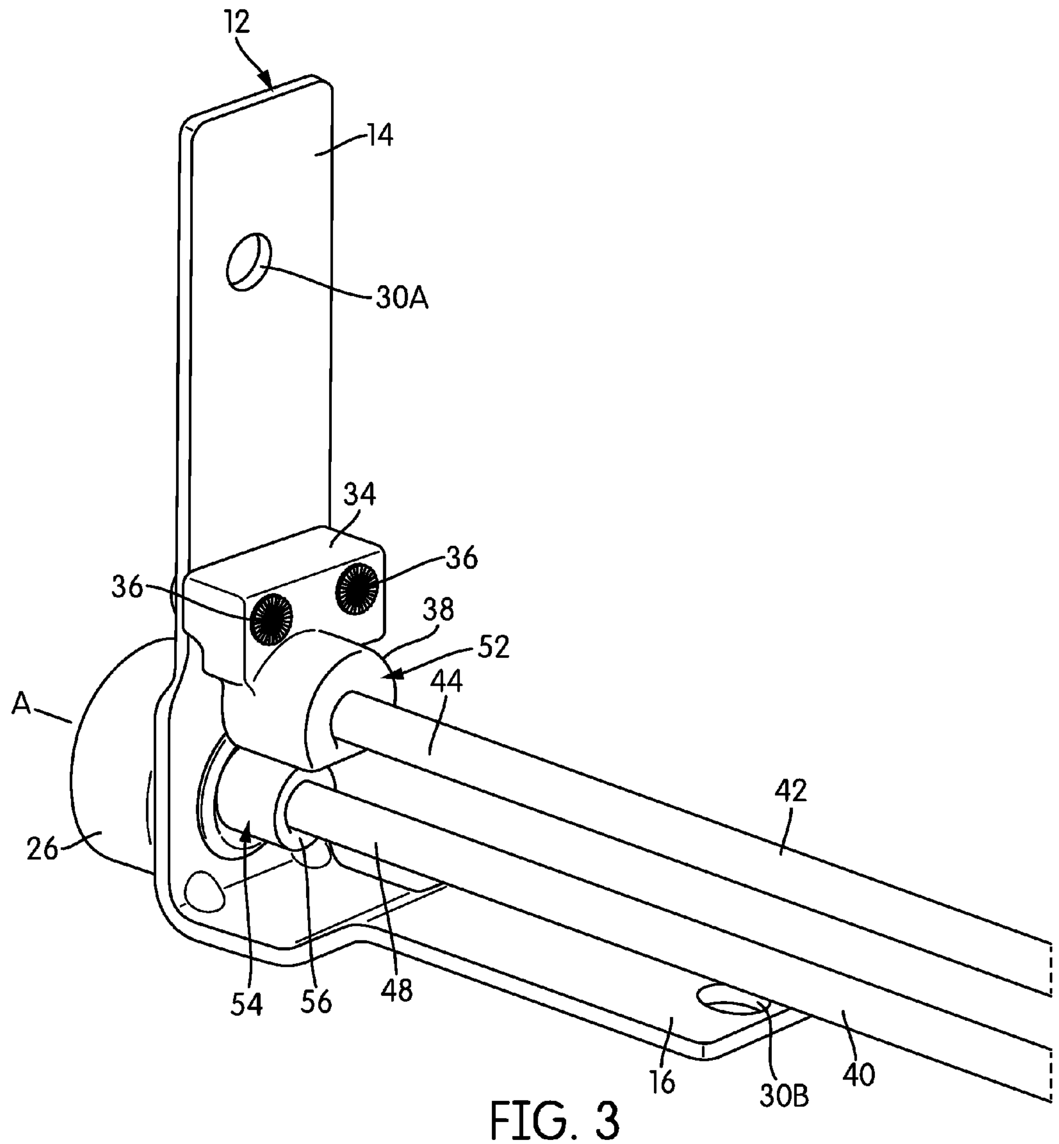
FIG. 3 is a back perspective view of the end of the hinge assembly of FIG. 2.

FIGS. 2 and 3 show in greater detail an example of the attachment of the first and second torque rods 40 and 42 to the bracket 12. In an embodiment, the first torque rod 40 is constructed for securement to the connector body 27 via a connector 54. The connector 54 may include a receiving opening 56, shown in FIG. 3, for example, designed to receive the first end 48 of the first torque rod 40 therein. The connector 54 is fixedly and securely connected to the connector body 27 so end 48 of the first torque rod 40 is fixed and does not rotate. The connector body 27, as noted previously, engages a hinge pin 24 that is fixed on the vehicle body 22, so that when the tailgate moves to an open position, the end 48 of the first torque rod 40 remains in a fixed position relative to the vehicle body 22. Thus, the bushing 26 and hinge bracket 12 are rotated about the pivot axis A and connector body 27 to which the end 48 of the first torque rod 40 is fixed.

On the other hand, the second torque rod 42 is constructed to be fixedly attached to a mounting block 34. The mounting block 34 is configured for securement to the hinge bracket 12 such that it substantially prevents the second torque rod 42 from rotating relative to the hinge bracket 12. FIG. 3 illustrates an example of the mounting block 34, which includes a fixed connector 38 that is secured to the hinge bracket 12 via fasteners 36 (such as rivets). The fixed connector 38 may include a receiving opening 52, designed to receive the first end 44 of the second torque rod 42 therein. The fixed connector 38 is fixedly and securely connected to the bracket 12. When the tailgate moves to an open position, for example, the end 44 of the second torque rod 42 remains in a fixed position, while the first torque rod 40 is rotating about the pivot axis A. The securement of this end of the second torque rod 42 in combination with the connector device 60 thus cause twisting or torqueing of the second torque rod 42, for example, when the tailgate is moved from the closed position to the open position.

Figure 4:
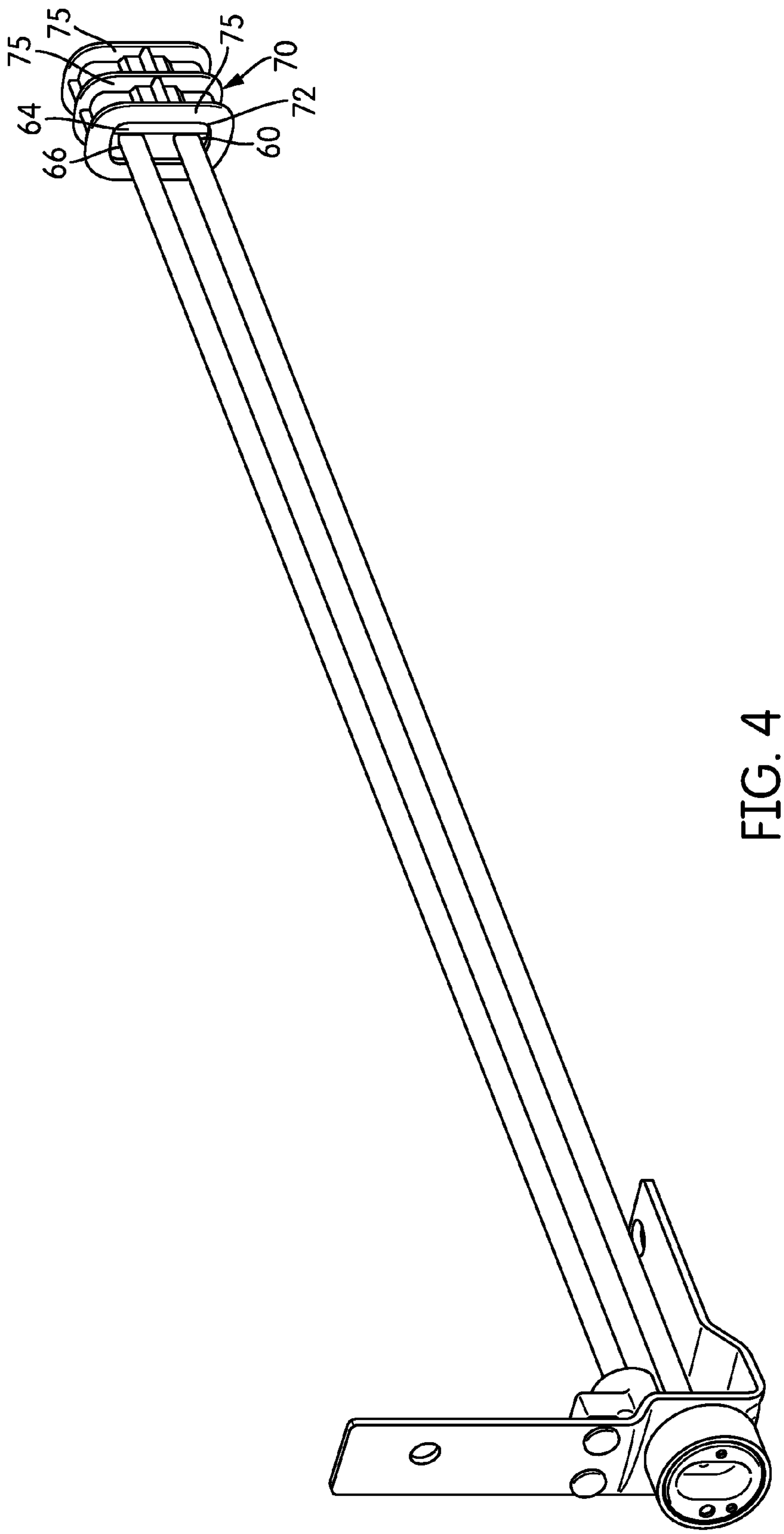
FIG. 4 is a perspective view of the hinge assembly of FIG. 1 including a shock absorber in accordance with an embodiment.

FIG. 4 as well as FIG. 1 shows an example embodiment wherein the connector device 60 anchoring the opposite, free ends of the first and second torque rods 40 and 42 includes a shock absorber 70 made of shock absorbing material. The shock absorber 70 acts as an isolator for the connector device 60 to reduce and/or prevent the connector device 60 from contacting the surrounding panels (e.g., sheet metal) of the tailgate positioned around the connector device 60. The shock absorber 70 further reduces noise should it contact any panel.

As shown, the shock absorber 70 may be provided around the connector device 60. In one embodiment, the connector device 60 may be coated with a shock absorbing material to form the shock absorber 70. In another embodiment, the shock absorber 70 may be formed (e.g., molded) to include a receiving opening 72 that is shaped to enclose the connector device 60 substantially around its exterior. The shock absorber 70 may be placed around or slid onto the assembled connector device 60 in a press-fit manner, for example. In an embodiment, the shock absorber 70 is formed from molded rubber. However, other shock absorbing materials, such as foam, neoprene, silicone, or other polymers may also be used to form the shock absorber.

In one embodiment, ribs 75 are provided on the shock absorber 70 that extend outwardly from its main body. The ribs 75 are configured to deflect if contact or impact is made with part of the internal walls of the tailgate (e.g., bottom wall panel 20) to dampen noise of the impact and dissipate energy from the impact as they distort. The ribs 75 may be placed in contact with the wall(s), or spaced a distance from the walls. The illustrative embodiment of FIG. 1 is not intended to be limiting. That is, the bottom wall panel 20 may be provided such that there is a space between the wall 20 and the ribs 75.

The design, shape, and other features of the ribs 75 and shock absorber 70 are also not intended to be limited to those illustrated. For example, the shape and thickness of the ribs 75 and the durometer of the material may be varied to find more optimal design features to prevent noise, and, in some embodiments, may be based on the type of material used to form the tailgate.

In another embodiment, one or both of the torque rods may be formed with different physical or mechanical properties (e.g., diameter, shape, material type) to change the spring rate. For example, in an embodiment, one rod could be of a lighter spring rate (as compared to the other rod) to adjust the counterbalance of the tailgate during opening and closing. In one embodiment, the diameters of one or both torque rods may be adjusted. In an embodiment, for tailgates made of heavier materials (e.g., steel), the spring rate of the rod(s) may be higher. In an embodiment, for tailgates made of lighter materials (e.g., light-weight aluminum), the spring rate of the rod(s) may be lower.

Figure 5:
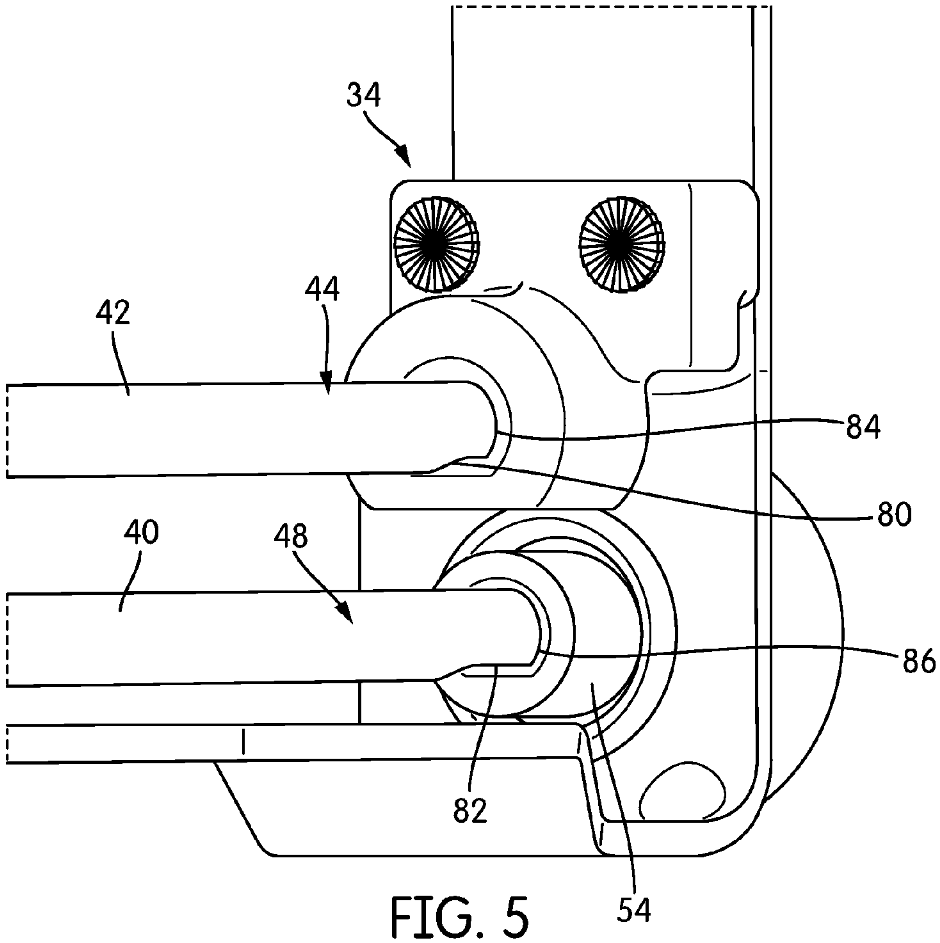
FIG. 5 is a back perspective view of an end of the hinge assembly of FIG. 1 in accordance with another embodiment.

In yet another embodiment, the rod(s) need not be of circular, cylindrical, or rounded shape, as is shown in the accompanying Figures. For example, the rods may be bars of rectangular or square cross-section that are configured for deflection upon rotation of the tailgate (or closure member). A combination of shapes may also be used. Accordingly, the shape of the bars is not intended to be limiting, and may be altered to adjust In an embodiment, the configuration and/or method of securing one or more of the torque rods 40, 42 may be altered. For example, as previously noted, in one embodiment, the first and second torque rods 40, 42 may be clamped between two parts 64, 66 and secured with fasteners 62 (e.g., rivets or bolts), as shown in FIG. 6. In accordance with an embodiment, at least one of the ends 48, 50, 44, and/or 46 of each of the first and second torque rods 40, 42 has a “D” shaped portion, or side that is flattened. The end(s) 48, 50, 44, and/or 46 of the first and second torque rods 40, 42 may have a flat machined on them, for example. As seen in FIG. 5, one or both of the ends 48, 44 of the first and second torque rods 40, 42 includes a “D” shaped portion 82, 80 (respectively). The “D” shaped portion 82 at the end 48 of the first torque rod 40 may be press-fit into a “D” shaped hole 86 of the connector 54. The “D” shaped portion 80 at the end 44 of the second torque rod 42 may be press-fit into a “D” shaped hole 84 of the mounting block 34.

As shown in FIG. 6, one or both of the free ends 50, 46 of the first and second torque rods 40, 42 includes a “D” shaped portion 86, 84 (respectively). Further, the connector device 60 includes complimentary slots 68 for receiving the “D” shaped portions 86, 84 of the first and second torque rods 40, 42 therein. The second part 66 of the connector device 60 may include “D” shaped slots 68, for example, for receiving at least part of the rods 40, 42 therein. The “D” shaped portion 86 at the end 50 of the first torque rod 40 may be aligned or press-fit into a “D” shaped slot 68 of the connector device 60. The “D” shaped portion 84 at the end 46 of the second torque rod 42 may be aligned or press-fit into a “D” shaped slot 68 of the connector device 60. The first part 64 may be placed onto the second part 66 and secured via the fasteners 62 to clamp the rods 40, 42 therebetween.

In accordance with an embodiment, all of the ends 48, 50, 44, and/or 46 of each of the first and second torque rods 40, 42 have a “D” shaped portion, or side that is flattened.

Accordingly, the disclosed configuration allows for length variation in the rods. In addition, the ends of the rods do not limit the assembly of the hinge assembly 10. Since one end on each rod is press-fit when connected to its noted part (on the hinge end), and the other is clamped or captured by the connection device and secured (e.g., using fasteners or rivets), the formation of the ends do not limit the structures themselves. Further, the use of press-fit connections on the hinge ends and fastening connections on the free ends is not intended to be limiting. That is, the types of connections could be swapped, e.g., in an embodiment, the ends 48, 44 of the first and second torque rods 40, 42 could be secured via fasteners, for example, and the free ends 50, 46 may be press fit into the connection device 60. In another embodiment, the connection method for the ends 48, 50, 44, and 46 may be the same, e.g., all ends 48, 50, 44, and 46 of the first and second torque rods 40, 42 may be press-fit into their connections or devices, or all ends 48, 50, 44, and 46 of the first and second torque rods 40, 42 may be secured via fasteners. Furthermore, the types of connections discussed above are not intended to be limiting. For example, other mechanical connections, such as bolts to secure the clamp blocks instead of rivets, or spot welding, or any other joining method, could be used to secure one or more of the end(s) 48, 50, 44, and/or 46 of the first and second torque rods 40, 42.

Figure 7:
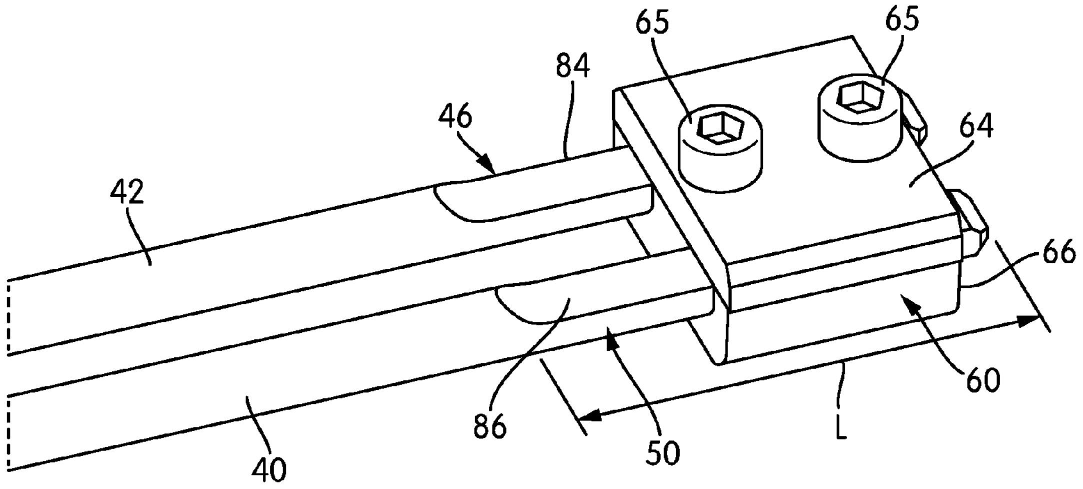
FIGS. 7 and 8 are top perspective views of the connector device in a first position and a second position, respectively.
Figure 8:
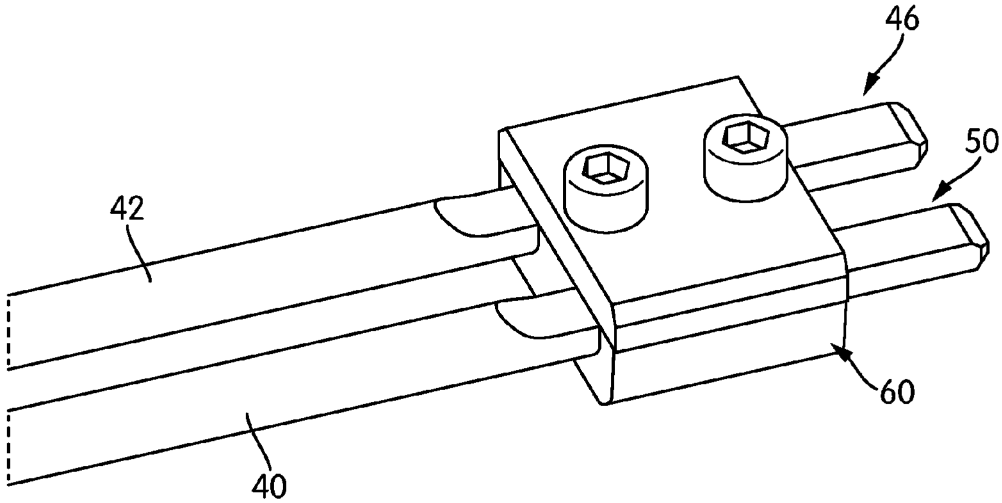

In addition to securing the torque rods 40, 42 therebetween, the connector device 60 and configuration of the torque rods 40, 42 as shown in FIG. 6 allows for adjustment of the connector device 60. That is, the connector device 60 may be configured for adjustment to allow an amount of counterbalance (i.e., torque assist) to be changed. The connector device 60 may have its parts 64, 66 secured via adjustable fasteners such as bolts 65, for example, such that the bolts 65 may be loosed to allow for adjustment of the connector device 60 along the ends 48, 44 of the rods 40, 42. FIG. 7 and FIG. 8 illustrate an example of the connector device 60 in a first position and a second position, respectively. The first position may be a low torque position, and the second position a high torque position. As shown in FIG. 7, for example, the ends 50, 46 of the rods 40, 42 each include a flattened portion (or "D" shaped portion 86, 84) of a length L. The connector device 60 may be placed at a distal end of this portion 86, 84 of the ends 50, 46 of the rods 40, 42 to provide lower torque. In FIG. 8, the connector device 60 is provided in the second position. The connector device 60 is placed at a proximal end of the flattened portion or "D" shaped portion 86, 84 of the rods 40, 42. The connector device 60 may be manually altered or moved via loosening the bolts 65 and sliding the connector device 60 into the second position, and then tightening the bolts 65 again to clamp and secure the connector device 60 in place.

Although not shown, it should be understood that the shock absorber 70, if provided with or around the connector device 60, may be configured to move with the connector device 60 between the first and second positions, in accordance with an embodiment.

Adjustment of the torque may be beneficial, for example, if a bed-liner is added to the tailgate of the pick-up truck. Such a device increases the weight of the tailgate. Thus, moving the connector device 60 such that it increases the collective spring rate of the torque rods will compensate for the added weight and make the lift effort the same as it was before the extra weight was added.

Although the connector device 60 is shown as being configured for movement between at least a first position (FIG. 7) and a second position (FIG. 8) on the opposite, free ends 50, 46 of the first and second torque rods 40, 42, it should be understood that the connector device 60 may be positioned at any portion along the lengths L of the "D" shaped portions 86, 84 to adjust the torque and spring rate of the rods.

As such, although some of the assembly details may have already been described above with reference to specific features of the hinge assembly 10, this disclosure also provides a method for assembling a hinge assembly for mounting a closure member between spaced apart body side panels of a vehicle body for movement about a pivot axis A between at least open and closed positions. The method includes connecting a first end 48 of the first torque rod 40 to a connector body 27 constructed for connection at the one side of the closure member and for connecting to the hinge bracket 12. The connector body 27 is configured for establishing a fixed connection to the vehicle body 22 and enabling the hinge bracket 12 to rotate about the pivot axis A. The first torque rod also has an opposite, free end 46. The method also includes connecting a first end 44 of a second torque rod 42 to the hinge bracket 12. As shown, the rods 40, 42 are in a parallel arrangement, with the second torque rod 42 spaced from the first torque rod 40 and pivot axis A. The hinge bracket 12 is constructed for connection to one side of the closure member, and the second torque rod 42 also has an opposite, free end 50. The method further includes anchoring the opposite, free ends 50 and 46 of the first torque rod 40 and the second torque rod 42 together via connector device 60.

In accordance with an embodiment, the method may further include providing shock absorbing material, such as shock absorber 70 or a another material, around the connector device 60. In another embodiment, the method may further include adjusting the connector device 60 from between the first position and the second position on the opposite, free ends of the first and second torque rods 40, 42 before the anchoring of the connector device.

This disclosed design further creates a self-contained assembly that does not require the torque rod to be installed into the tailgate before assembly. In designs with a full length torque rod (i.e., that spans the entire length of the tailgate), there is an extra assembly step to install the rod into the vehicle. Since the rods 40, 42 are anchored on the same as the drive side of the tailgate, they may be installed from one side of the tailgate. Providing the rods 40, 42 as assembled herein therefore reduces the assembly time and complexity at the OEM. The OEM has less parts to handle and there is less labor to install the hinge assembly and torque rods.

In addition, designs having a full length torque rod are attached to both hinges. Accordingly, the length of such a rod is dictated by the width of the tailgate. This can result in a torque rod that is longer than necessary when designing to provide the required lift assist, and, at most times, results in a heavier torque rod. Alternatively, the disclosed hinge assembly 10 may be designed and optimized in order to use whatever length may be required to get the desired lift assist (desired torque) without adding unnecessary weight or costs. The disclosed hinge assembly 10 uses a dual rod design with a counterbalance to reduce the weight of the tailgate and make it easier to rotate the tailgate between its positions (e.g., via assisted lift to the closed position). This is because the torque rods 40, 42 do not extend across the entire length of the tailgate, and are torqued via the twisting motion incurred because of both of the rods being anchored together and connected to the hinge bracket. Plus, the disclosed assembly 10 may reduce the weight of the parts in the tailgate. Further, the disclosed hinge assembly 10 allows for packaging of two straight torque rods 40, 42 in a smaller volume (as compared to a single bent torque rod, for example).

Also, use of an adjustable counterbalance, such as illustrated in FIGS. 7 and 8, gives design flexibility to use different rod to tune the amount of lift assist (torque) given by the system.

Moreover, as tailgates are becoming more complex, e.g., with the addition of back-up cameras, and because the wiring for the internal components on the tailgate typically enter through the bottom of the tailgate to connect the tailgate to the rest of the vehicle wiring, installation of the parts can become cumbersome and access to wiring and parts associated with the tailgate can be difficult. For example, a full length torque rod may block or limit access for the wiring over the entire width of the gate. In contrast, since the disclosed hinge assembly only spans a smaller portion (smaller length) of the tailgate, a larger portion of the tailgate is free to install wiring. Thus, the hinge assembly 10 frees up access to install wiring through the bottom of the tailgate.

The above described components of the hinge assembly 10 are not meant to be limiting. For example, seals, liners, or other devices may be provided to reduce friction, noise and wear between the parts of the hinge assembly 10. In an embodiment, one or both of the torque rods 40, 42 may include shock absorbing elements or isolators thereon to reduce noise and contact with adjacent parts, for example.

Again, although discussed herein with reference to its use in tailgates in pick-up trucks, it should be understood that the dual torque rod design of the disclosed hinged assembly 10 could also or alternatively be applied to other doors or closure members with a horizontal hinge axis, e.g., for a lift gate on the back of an SUV.

Additionally, although the drawings show a design utilizing two torque rods, this disclosure also covers a system with more torque rods that is designed using a similar principle. For example, a hinge assembly comprising four torque rods (e.g., two more rods) with couplers may be implemented in a closure member. In such an embodiment, the use of more than two rods allows the rods to be formed of a shorter length.

Moreover, the materials described with reference to the assembly 10 should not be limiting. Any number or type of materials may be implemented.

While the principles of the disclosure have been made clear in the illustrative embodiments set forth above, it will be apparent to those skilled in the art that various modifications may be made to the structure, arrangement, proportion, elements, materials, and components used in the practice of the disclosure.

It will thus be seen that the features of this disclosure have been fully and effectively accomplished. It will be realized, however, that the foregoing preferred specific embodiments have been shown and described for the purpose of illustrating the functional and structural principles of this disclosure and are subject to change without departure from such principles. Therefore, this disclosure includes all modifications encompassed within the spirit and scope of the following claims.

What is claimed is:

1. A hinge assembly for mounting a closure member between spaced apart body side panels of a vehicle body for movement about a pivot axis between at least open and closed positions comprising:

a hinge bracket constructed for connection to one side of the closure member;

a connector body constructed for connection at the one side of the closure member and for connecting to the hinge bracket, the connector body configured for establishing a fixed connection to the vehicle body and enabling the hinge bracket to rotate about the pivot axis;

a first torque rod having one end fixed to the connector body and an opposite, free end;

a second torque rod spaced from the first torque rod and pivot axis, the second torque rod having one end fixed to the hinge bracket and an opposite, free end; and a connector device constructed to anchor the opposite, free ends of the first and second torque rods together within the closure member;

wherein the torque rods are configured to deflect when the closure member is pivoted between the at least open and closed positions to produce a biasing torque towards an opposite position.

2. The hinge assembly according to claim 1, wherein the first torque rod is constructed for securement to the connector body.

3. The hinge assembly according to claim 2, wherein the second torque rod is constructed to be fixedly attached to a mounting block, the mounting block configured for securement to the hinge bracket such that it substantially prevents the second torque rod from rotating relative to the hinge bracket.

4. The hinge assembly according to claim 3, further comprising a hinge pin, the hinge pin configured to connect the connector body and one of the side panels of the vehicle body.

5. The hinge assembly according to claim 1, further comprising a second connector body for connection at the other side of the closure member, the second connector body configured for alignment on and rotation about the pivot axis and for connection to a second of the side panels of the vehicle body.

6. The hinge assembly according to claim 1, wherein the connector device anchoring the opposite, free ends of the first and second torque rods comprises shock absorbing material.

7. The hinge assembly according to claim 6, wherein the shock absorbing material is provided around the connector device.

8. The hinge assembly according to claim 7, wherein the shock absorbing material is rubber.

9. The hinge assembly according to claim 1, wherein at least one of the ends of each of the first and second torque rods comprises a "D" shaped portion.

10. The hinge assembly according to claim 9, wherein the opposite, free ends of each of the first and second torque rods comprises "D" shaped portions.

11. The hinge assembly according to claim 10, wherein the connector device comprises complimentary slots for receiving the "D" shaped portions of the first and second torque rods.

12. The hinge assembly according to claim 1, wherein the connector device comprises complimentary slots for receiving the first and second torque rods therein.

13. The hinge assembly according to claim 1, wherein the connector device is configured for movement between at least a first position and a second position on the opposite, free ends of the first and second torque rods.

14. A vehicle door comprising:

a hinge assembly for mounting a closure member between spaced apart body side panels of a vehicle body for movement about a pivot axis between at least open and closed positions comprising:

a hinge bracket constructed for connection to one side of the closure member;

a connector body constructed for connection at the one side of the closure member and for connecting to the hinge bracket, the connector body configured for establishing a fixed connection to the vehicle body and enabling the hinge bracket to rotate about the pivot axis;

a first torque rod having one end fixed to the connector body and an opposite, free end;

a second torque rod spaced from the first torque rod and pivot axis, the second torque rod having one end fixed to the hinge bracket and an opposite, free end; and a connector device constructed to anchor the opposite, free ends of the first and second torque rods together within the closure member;

wherein the torque rods are configured to deflect when the closure member is pivoted between the at least open and closed positions to produce a biasing torque towards an opposite position.

15. The vehicle door claim 14, wherein the vehicle door is a tailgate.

16. A vehicle comprising:

a body having an opening;

a closure member for closing the opening, the closure member being pivotally mounted to the body at the opening for movement about a generally horizontal pivot axis between a raised position and a lowered position;

a pair of hinge mechanisms on opposing sides of the closure member, the hinge mechanisms pivotally mounting the closure member for the movement about the pivot axis;

wherein one of the pair of hinge mechanisms comprises:

a hinge assembly for mounting a closure member between spaced apart body side panels of a vehicle body for movement about a pivot axis between at least open and closed positions comprising:

a hinge bracket constructed for connection to one side of the closure member;

a connector body constructed for connection at the one side of the closure member and for connecting to the hinge bracket, the connector body configured for establishing a fixed connection to the vehicle body and enabling the hinge bracket to rotate about the pivot axis;

a first torque rod having one end fixed to the connector body and an opposite, free end;

a second torque rod spaced from the first torque rod and pivot axis, the second torque rod having one end fixed to the hinge bracket and an opposite, free end; and a connector device constructed to anchor the opposite, free ends of the first and second torque rods together within the closure member;

wherein the torque rods are configured to deflect when the closure member is pivoted between the at least open and closed positions to produce a biasing torque towards an opposite position.

17. The vehicle according to claim 16, wherein the closure member is a tailgate.

18. A method for assembling a hinge assembly for mounting a closure member between spaced apart body side panels of a vehicle body for movement about a pivot axis between at least open and closed positions, the method comprising:

connecting a first end of a first torque rod to a connector body constructed for connection at the one side of the closure member and for connecting to a hinge bracket, the connector body configured for establishing a fixed connection to the vehicle body and enabling the hinge bracket to rotate about the pivot axis, and the first torque rod having an opposite, free end;

connecting a first end of a second torque rod to the hinge bracket, the hinge bracket constructed for connection to one side of the closure member, and the second torque rod having an opposite, free end and being spaced from the first torque rod and the pivot axis; and anchoring the opposite, free ends of the first torque rod and the second torque rod together via the connector device.

19. The method according to claim 18, further comprising providing shock absorbing material around the connector device.

20. The method according to claim 18, wherein the connector device is configured for movement between at least a first position and a second position on the opposite, free ends of the first and second torque rods, and wherein the method further comprises adjusting the connector device from between the first position and the second position on the opposite, free ends of the first and second torque rods before the anchoring of the connector device.

* * * * *